Feb. 19, 1935. T. EWAN ET AL 1,992,060
PROCESS FOR TREATING CYANIDE SOLUTIONS
Filed May 11, 1933
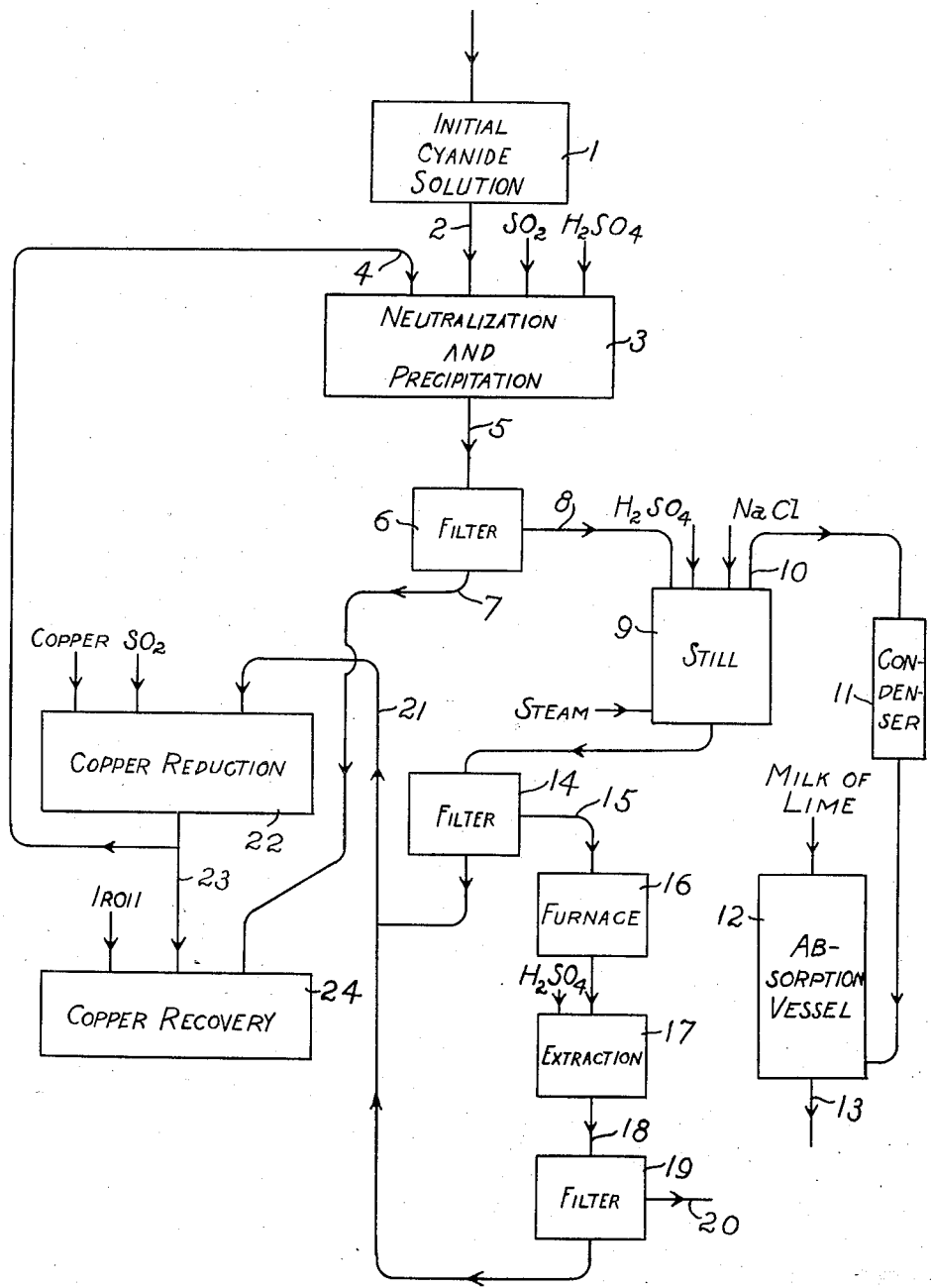
INVENTORS.
Thomas Ewan
Reginald J. Lemmon
BY
ATTORNEY.

Patented Feb. 19, 1935

1,992,060

UNITED STATES PATENT OFFICE 1,992,060

PROCESS FOR TREATING CYANIDE SOLUTIONS

Thomas Ewan and Reginald John Lemmon, Norton-on-Tees, England, assignors to Imperial Chemical Industries Limited, a corporation of Great Britain Application May 11, 1933, Serial No. 670,590
In Great Britain May 24, 1932

4 Claims. (Cl. 75—185)

This invention relates to an improved method of treating cyanide solutions for the recovery of cyanide and/or metal values therefrom, and in particular to the treatment of cyanide solutions containing precious metals.

The extraction of gold from ores by means of a dilute alkali metal or alkaline earth metal cyanide solution and the subsequent precipitation of the gold by means of zinc dust or shavings followed by re-use of the solution for the extraction of more gold, is a well known process. It is also well known that the gold may be recovered from the cyanide solution by electrodeposition.

Cyanide solutions which have been used for the extraction of an ore may contain, in addition to precious metal cyanide compounds, appreciable amounts of complex cyanides of which base metals are constituents, and there may also be thiocyanates in solution. For example, this may occur when the ore treated contains iron sulphides. These complex base metal cyanides and thiocyanates result from the action of the cyanide solution on the ore and their amount and character depend on the type of ore, but in any case their formation causes a conversion of the useful cyanide into substances without appreciable solvent action on precious metal values in the ore. This is obviously a disadvantage when the cyanide solution is re-used for further extraction after the precipitation operation. In addition to the increased cyanide consumption there may be a further disadvantage owing to the difficulties arising in the precipitation of the gold.

For example, it has been found that there is considerable difficulty in applying the cyanide process to certain gold bearing ores which contain copper. In the extraction of such ores the cyanide solution dissolves copper in addition to the gold and, as a result, difficulties arise in the recovery of the gold by precipitation with zinc or by electrodeposition. In the case of precipitation by zinc, a coating of copper is formed on the zinc which gradually inhibits the precipitation of the gold, with the consequent incomplete recovery of this metal. This last mentioned difficulty may, to a certain extent, be avoided by the use of a small amount of lead associated with the zinc, or by increasing the cyanide concentration. Both these methods result in better yields of gold but the recirculation of the cyanide solution eventually causes the building up of the copper content, and the cycle of the process can only be maintained by purging a portion of the copper bearing solution and replenishing with fresh cyanide in much greater quantity than is otherwise necessary. In addition to the above there is the further disadvantage that the gold recovered from copper bearing solutions is contaminated with copper and the subsequent separation which is necessary is an additional expense. Difficulties also occur when other base metals are present, although the difficulties are not so great.

The foregoing paragraphs apply equally to the recovery of silver as well as to the recovery of gold.

According to the present invention we treat a cyanide solution, containing precious metals, with a cuprous salt in sufficient amount to precipitate all the cyanide together with all the precious metal values, the solution for this purpose being maintained substantially neutral or slightly acid. According to a further feature of the invention we recover cyanide values and precious metal and copper values from the separated precipitate, which consists of cuprous cyanide together with cyanide compounds of precious and any base metals, by treatment with a chloride of an alkali or alkaline earth metal, and a suitable acid such as sulphuric acid. By this treatment cyanide values are converted to hydrocyanic acid which may be recovered in any suitable manner; the precious metals and any copper thiocyanate remain as an insoluble residue, and the remaining copper and base metals are dissolved.

The invention will be better understood by reference to the accompanying drawing, which is a diagrammatic flow sheet. The process described, with reference to this flow sheet, is applied to a solution obtained in the cyanide process for the extraction of gold ore, and which contains "free" cyanide, alkali, and thiocyanates, as well as gold, silver, iron and copper in the form of complex cyanides. The solution may also contain other salts, of alkali or alkaline earth metals, but as these do not appear to enter into the reaction they may be disregarded.

Referring to the drawing, the clear solution resulting from the extraction of the ore is fed from a stock tank 1 by pipe 2 into a vessel 3 fitted with a stirrer (not shown) for thoroughly mixing the contents during the operations of neutralization and precipitation. The initial solution is first neutralized by adding sulphuric acid or sulphur dioxide, the amount of acid added being preferably only sufficient to render the solution incapable of reddening phenol phthalein. After neutralization a solution of a cuprous salt is added by pipe 4, in sufficient amount to precipitate all the cyanide and precious metal values. The cuprous salt solution may be prepared by the reduction of copper sulphate by means of sulphur dioxide and metallic copper in presence of sodium chloride. Preferably, however, this method is only adopted for the first solution when starting up the process, as the cuprous salt may be readily recovered and may be continuously circulated as will be explained later. We have found that careful attention must be paid to the amount of cuprous salt added and that to ensure complete precipitation of the gold sufficient copper salt must be added to enable copper to be easily detectable in the filtered solution. (Copper is detected in a sample of the solution after oxidation by nitric acid by the well known blue colour produced on adding ammonia.) The point at which a just detectable amount of copper is present in solution is that at which the minimum copper addition has been made. It is advantageous from the point of view of gold precipitation to add the cuprous salt solution in considerable excess above this minimum. An excess up to 25% of over the minimum amount may be added, but 15% will usually be sufficient.

After precipitation is complete the reaction mixture is passed by pipe 5 to a filter 6, a filter press of any usual type being suitable. The liquor leaving the filter by pipe 7 contains no valuable constituents, with the exception of any excess cuprous salt which may have been added in the previous operation, and may be run to waste, or if desired, it may be treated for the recovery of copper by passing it to the tank 24, the function of which is described later.

The solids separated by filtration and removed at 8 consist of complex cyanides of copper and iron, copper thiocyanate, and gold and silver salts. These solids are next heated, preferably by live steam, with sulphuric acid and sodium chloride in a still 9 of suitable resistant material, so as to liberate hydrocyanic acid and to dissolve the heavy metal constituents. The amount of sulphuric acid must be slightly in excess of that equivalent to the recoverable cyanide combined with copper and iron, while the amount of sodium chloride used must be that required to form cuprous chloride from the copper present, together with a sufficient excess to ensure solution of the cuprous chloride formed. It may also be necessary to add water, in an amount dependent on that already present in the filter cake and on the steam added for heating; the final quantity of water present should be sufficient to dissolve the soluble base metal compounds formed, but is preferably maintained as near this lower limit as possible in order that the evolution of hydrocyanic acid may be as complete as possible. We have found that if these conditions are observed, over 90% of the hydrocyanic acid can be recovered.

The evolved vapours, consisting of hydrocyanic acid and steam, are passed by pipe 10 through condenser 11 to an absorption vessel 12 where they are treated with milk of lime, thereby forming a calcium cyanide solution which is suitable for use in the extraction of further quantities of ore. Additional cyanide is added to the solution withdrawn at 13 to make up for the consumption of cyanide due to formation of thiocyanates, mechanical losses and incomplete evolution of hydrocyanic acid in the still 9.

The slurry remaining in the still after the evolution of the hydrocyanic acid is filtered in a filter press 14, after which the solids are preferably washed with a slightly acid brine to remove adherent cuprous chloride. The solids in the filter cake consist essentially of copper thiocyanate, gold cyanide, and silver, probably in the form of chloride. These solids are removed from the filter press 14 and 15 and pass to a roasting furnace 16 where the copper thiocyanate is converted into oxide. The solid product is then passed to a vessel 17 in which it is treated with dilute sulphuric acid. The copper oxide is dissolved and the silver and gold remain in the form of a sludge. The mixture is passed by pipe 18 to a filter 19, and the solid cake containing gold and silver is removed at 20. It is then worked up in the usual manner into bullion.

The liquor from the filter 19 contains copper sulphate and is conveniently joined with the liquor proceeding from the filter 14 and the combined liquors are passed by pipe 21 to a vessel 22, in which they are subjected in a slightly warmed condition to the action of metallic copper and if desired, of sulphur dioxide in order to reduce any cupric copper to the cuprous form. It may be found, due to mechanical losses, that there is insufficient copper in the liquor fed in by pipe 21 to satisfy the requirements of the precipitation carried out in vessel 3. If this is the case then additional copper may be introduced as metal in the reducing process carried out in vessel 22. On the other hand, if there is an appreciable amount of copper present in the initial cyanide solution or an excessive amount of oxidized copper in the liquors from the filters 6 and 14, leading to a large consumption of copper in the vessel 22, it may be found that the reduced liquor from 22 is more than sufficient to suffice for the precipitation in the vessel 3. In this case a portion of the reduced liquor may be passed by pipe 23 to a vessel 24 in which metallic copper is precipitated by means of scrap iron. The recovered copper may be utilized for the reduction process and there may even be a surplus of the metal in the event of an appreciable quantity of copper being dissolved from the ore by the cyanide solution.

The freshly reduced solution of cuprous salt from the vessel 22 will be strongly acid and it will also contain a considerable quantity of iron salts. In certain circumstances it may be advantageous to remove substantially all the acid and even the iron from this liquor. If this is found to be the case, neutralization can be effected by the addition of calcium carbonate and heating with an excess of this agent will also effectively precipitate the iron, which can then be removed by filtration.

The invention is not restricted to the precise form of process described above with reference to the drawing, nor is it restricted to the treatment of the particular type of initial cyanide solution mentioned in connection with the said process.

We are aware that it has been proposed to recover gold from gold bearing cyanide solutions by acidifying and then precipitating cuprous cyanide along with aurous cyanide by addition of cuprous chloride. In this proposal it was stated that only a very small quantity of cuprous chloride suffices to procure a complete separation of the gold and that after separation of the gold-copper precipitate the liquor contains all the cyanide as free hydrocyanic acid, less the small quantity combined in the precipitate. Neutralization of the free hydrocyanic acid with alkali gives the solution of cyanide for the next extraction. In practical working this process possesses the marked disadvantage that during practically the whole operation free hydrocyanic acid is present in the acid solution and may easily be evolved and lost. It has also been found that under the conditions specified there is only a very incomplete separation of the gold from solutions such as are encountered in practice.

We claim:

1. A process for the recovery of cyanide and metal values from cyanide solutions which have been used for the extraction of precious metals, the said solutions containing free cyanide, alkali, precious and base metals in the form of complex cyanides, and thiocyanate, which comprises treating the solution with a solution of a cuprous salt in sufficient amount to precipitate all the cyanide together with all the precious metal values while maintaining the solution substantially neutral or slightly acid, separating the precipitate consisting essentially of cuprous cyanide together with cyanide compounds of precious and any other base metals, treating the said precipitate with acid to liberate hydrocyanic acid, separating the insoluble residue containing the precious metals, roasting the said residue to convert copper thiocyanate to oxide, treating the resulting product with acid to dissolve out the copper and leave the precious metals as an insoluble residue, and utilizing the dissolved copper for precipitating the cyanide and precious metal values from a further quantity of the initial cyanide solution.

2. A process for the recovery of cyanide and metal values from cyanide solutions which have been used for the extraction of precious metals, the said solutions containing free cyanide, alkali, and precious and base metals in the form of complex cyanides, which comprises treating the solution with an aqueous solution of alkali metal chloride containing dissolved cuprous chloride, said solution of cuprous chloride being added in sufficient amount to precipitate all the cyanide together with all the precious metal values, separating the precipitate consisting essentially of cuprous cyanide together with cyanide compounds of precious and any other base metals, treating the said precipitate with an alkali metal chloride together with sulphuric acid in the presence of water whereby the cyanide values are converted to hydrocyanic acid and the copper values previously combined as cyanide are dissolved as cuprous chloride in the aqueous solution of alkali metal chloride, driving off said hydrocyanic acid and recovering cyanide values corresponding thereto, separating from the insoluble residue containing the precious metals the aqueous solution containing cuprous chloride and alkali metal chloride and utilizing said solution for precipitating the cyanide and precious metal values from a further quantity of the initial cyanide solution.

3. A process as set forth in claim 2, in which the aqueous solution containing cuprous chloride and alkali metal chloride which has been separated from the insoluble residue containing the precious metals after the hydrocyanic acid has been driven off, is treated for the reduction to a cuprous form of any cupric copper it may contain prior to use in the precipitation of further cyanide and precious metal values.

4. A process as set forth in claim 2, in which the aqueous solution containing cuprous chloride and alkali metal chloride which has been separated from the insoluble residue containing the precious metals after the hydrocyanic acid has been driven off, is treated for the removal of iron, prior to using it for the precipitation of further cyanide and precious metal values.

THOMAS EWAN.
REGINALD JOHN LEMMON.